United States Patent
Chu et al.

(10) Patent No.: US 11,326,997 B2
(45) Date of Patent: May 10, 2022

(54) SURFACE WETTABILITY DETERMINATION METHOD

(71) Applicant: INDUSTRIAL TECHNOLOGY RESEARCH INSTITUTE, Hsinchu (TW)

(72) Inventors: Jen-You Chu, Hsinchu (TW); Feng-Sheng Kao, Hsinchu (TW); Yun-Hsin Wang, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 16/586,490

(22) Filed: Sep. 27, 2019

(65) Prior Publication Data
US 2020/0103325 A1    Apr. 2, 2020

Related U.S. Application Data

(60) Provisional application No. 62/738,266, filed on Sep. 28, 2018.

(51) Int. Cl.
*G01N 13/02*    (2006.01)
(52) U.S. Cl.
CPC ................... *G01N 13/02* (2013.01)
(58) Field of Classification Search
CPC ...... G01N 13/02; G01N 21/552; G01N 21/55; G01N 21/94
USPC ...................... 356/445–448, 237.1–237.6, 72
See application file for complete search history.

(56) References Cited

U.S. PATENT DOCUMENTS

| | | | |
|---|---|---|---|
| 4,199,261 A * | 4/1980 | Tidd | G01N 21/55 356/448 |
| 4,585,348 A * | 4/1986 | Chastang | G01N 21/211 356/369 |
| 5,080,484 A * | 1/1992 | Schneider | G01N 13/02 356/138 |
| 5,329,357 A * | 7/1994 | Bernoux | G01N 21/211 356/367 |
| 5,333,052 A * | 7/1994 | Finarov | G01B 11/0641 356/369 |

(Continued)

FOREIGN PATENT DOCUMENTS

| CN | 101688835 A | 3/2010 |
|---|---|---|
| CN | 102183297 A | 9/2011 |

(Continued)

OTHER PUBLICATIONS

Taiwan Office Action dated Oct. 8, 2021 as received in application No. 108135328.

(Continued)

*Primary Examiner* — Isiaka O Akanbi
(74) *Attorney, Agent, or Firm* — Maschoff Brennan

(57) ABSTRACT

A surface wettability determination system includes a sprayer, a light emission device and an optical detector. The sprayer is provided to spray a liquid on a detected surface of a detected object. The light emission device is provided to emit a light beam toward the detected surface. The light beam is reflected by the liquid on the detected surface to generate a reflected light. The optical detector is provided to receive the reflected light and output a determining signal, and the determining signal is related to a wettability of the detected surface.

5 Claims, 4 Drawing Sheets

(56) References Cited

U.S. PATENT DOCUMENTS

| | | | | |
|---|---|---|---|---|
| 5,708,278 | A * | 1/1998 | Lowne | G01N 21/55 250/214 A |
| 5,717,485 | A * | 2/1998 | Ito | G01N 21/94 356/237.1 |
| 7,369,233 | B2 * | 5/2008 | Nikoonahad | G01N 21/8806 356/237.2 |
| 8,269,968 | B2 | 9/2012 | Brochard et al. | |
| 9,286,779 | B2 * | 3/2016 | Shaw | G08B 17/00 |
| 2006/0163458 | A1 * | 7/2006 | Reime | B60S 1/0844 250/227.25 |
| 2007/0122551 | A1 * | 5/2007 | Yamamoto | G03F 7/3021 427/240 |
| 2009/0097032 | A1 * | 4/2009 | Feng | G01N 21/553 356/445 |
| 2010/0024529 | A1 * | 2/2010 | Dillingham | G01N 13/02 73/64.52 |
| 2010/0045984 | A1 * | 2/2010 | Brochard | G01N 21/55 356/369 |
| 2010/0328654 | A1 * | 12/2010 | Verschuren | G01N 21/552 356/237.2 |
| 2011/0109910 | A1 * | 5/2011 | Georgakoudi | G01N 21/47 356/446 |
| 2013/0031957 | A1 * | 2/2013 | Shaw | G08B 17/113 73/28.01 |
| 2013/0089465 | A1 * | 4/2013 | Lazzarino | G01N 29/022 422/69 |
| 2017/0146461 | A1 * | 5/2017 | Vahey | G01N 21/94 |
| 2017/0228882 | A1 * | 8/2017 | Dillingham | G01N 21/94 |
| 2017/0307536 | A1 * | 10/2017 | Dillingham | G01N 21/8507 |
| 2019/0316736 | A1 * | 10/2019 | Jacksier | G01B 11/26 |
| 2020/0072598 | A1 * | 3/2020 | Hsu | G01N 21/211 |

FOREIGN PATENT DOCUMENTS

| | | |
|---|---|---|
| CN | 102271976 A | 12/2011 |
| CN | 104949939 A | 9/2015 |
| CN | 106501134 A | 3/2017 |
| CN | 107923928 A | 4/2018 |
| EP | 1893974 A1 | 3/2008 |
| WO | 03/036269 A1 | 5/2003 |
| WO | 2006/131568 A1 | 12/2006 |

OTHER PUBLICATIONS

Chinese Office Action dated Dec. 29, 2021 as received in application No. 201910931830.9.

Tan, Xiao-Hong et al., "Nanotechnology and Nano-textiles" Dec. 31, 2011.

Huang, Jian-Ye et al., "Wetting Transition and Stability Testing of Superhydrophobic State" Oct. 8, 2013.

Munetoshi Sakai et al., "Effect of Surface Structure on the Sustainability of an Air Layer on Superhydrophobic Coatings in a Water-Ethanol Mixture" Dec. 3, 2008.

* cited by examiner

SURFACE WETTABILITY DETERMINATION METHOD

CROSS-REFERENCE TO RELATED APPLICATIONS

This non-provisional application claims priority under 35 U.S.C. § 119(a) on Patent Application No(s). 62/738,266 filed in U.S. on Sep. 28, 2018, the entire contents of which are hereby incorporated by reference.

BACKGROUND

This present disclosure relates to a surface wettability determination system and a surface wettability determination method.

The surface wettability of materials usually depends on the chemical composition or the profile on the surface. Currently, the surface wettability can be changed through chemical or physical surface modifications. For example, for shoe making, after an insole or an outsole is manufactured, its surface is treated by oxygen plasma to become highly hydrophilic, in order to facilitate the sole attaching with environmental friendly water glue. It is necessary to detect the surface wettability of the sole in order to confirm whether the surface modification is in good condition.

In a conventional method, the surface wettability is determined according to the contact angle of liquid on the surface. The liquid is provided on the surface, and an image of a lateral side of the liquid is captured to measure the contact angle, thereby determining the surface wettability through the contact angle. Another alternative method to detected surface wettability is based on fluorescence, which hydrophilic group on the surface could be excited by UV light. The amount of chemical substances on the surface is inferred from the measured fluorescence intensity, and thus determining the wettability.

SUMMARY

According to one embodiment of the present disclosure, a surface wettability determination system includes a sprayer, a light emission device and an optical detector. The sprayer is provided to spray a liquid on a detected surface of a detected object. The light emission device is provided to emit a light beam toward the detected surface. The light beam is reflected by the liquid on the detected surface to generate a reflected light. The optical detector is provided to receive the reflected light and output a determining signal, and the determining signal is related to a wettability of the detected surface.

According to another embodiment of the present disclosure, a surface wettability determination method includes the steps of: spraying a liquid on a detected surface of a detected object; emitting a light beam toward the detected surface, wherein the light beam is reflected by the liquid on the detected surface to generate a reflected light; and receiving the reflected light and outputting a determining signal by an optical detector according to the reflected light, wherein the determining signal is related to a wettability of the detected surface.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
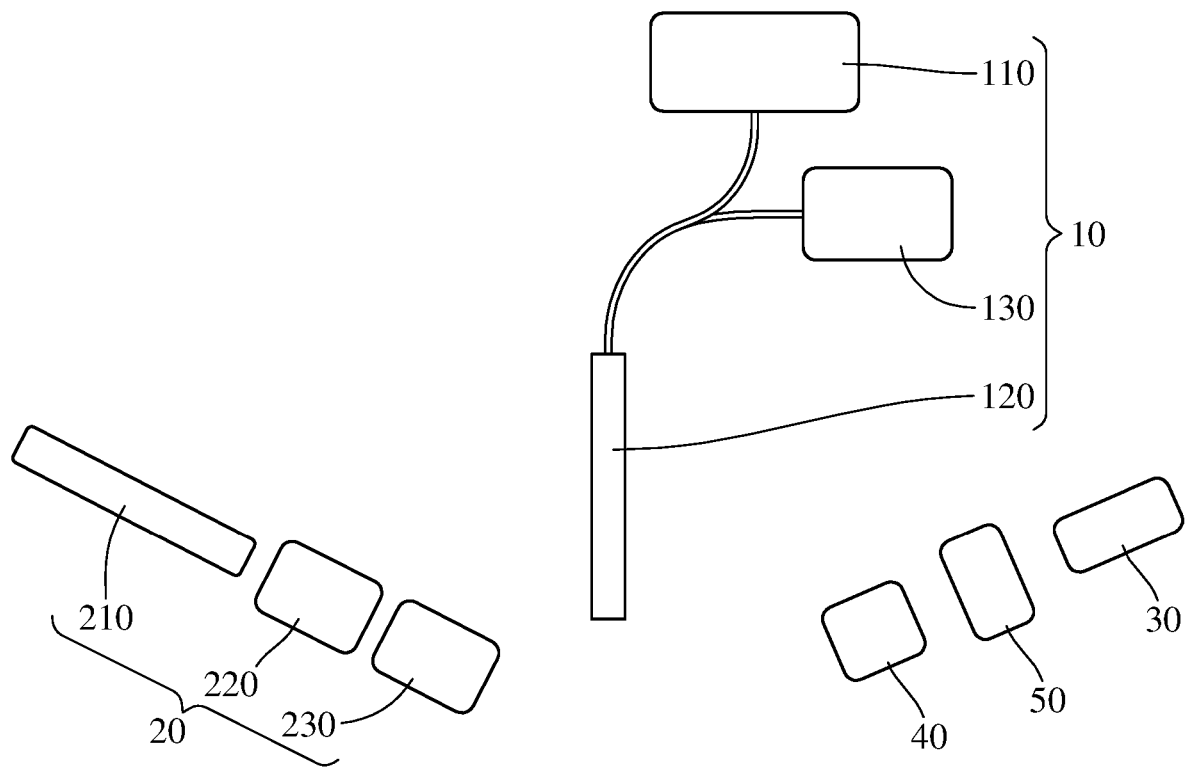
FIG. 1 is a schematic view of a surface wettability determination system according to one embodiment of the present disclosure.

Please refer to FIG. 1, which is a schematic view of a surface wettability determination system according to one embodiment of the present disclosure. According to one embodiment, a surface wettability determination system 1 includes a sprayer 10, a light emission device 20 and an optical detector 30.

The sprayer 10 includes a container 110, a spray nozzle 120 and a pump 130. The container 110 is provided for storing liquid such as water, ethanol and silicone oil. The spray nozzle 120 is communicated with the container 110, and the pump 130 is disposed between the container 110 and the spray nozzle 120. The pump 130 moves liquid from the container 110 and deliver liquid to the spray nozzle 120. In this embodiment, the spray nozzle 120 can include single-phase spray nozzle, two-phase spray nozzle or ultrasonic spray nozzle.

The light emission device 20 includes a light emitting component 210, a beam shaper 220 and a polarizer 230. The light emitting component 210, for example but not limited to, is a laser emitter, a light emitting diode, a halogen lamp or a mercury vapor lamp for emitting a light beam 211. The beam shaper 220, for example but not limited to, is an optical element for adjusting the diameter of the light beam 211 and collimating the light beam 211. The polarizer 230, for example but not limited to, is a sheet for filtering the light beam 211 passing through the light emission device 20 into a beam of single polarization.

The optical detector 30, for example, is a photovoltaic detector, a photo-thermoelectric detector, an optical meter, a charge coupled device (CCD) or a complementary metal-oxide-semiconductor (CMOS) for detecting light and converting light intensity into digital signal.

In this embodiment, the surface wettability determination system 1 further includes an analyzer 40 and an optical lens 50 which are disposed to correspond to the optical detector 30. The analyzer 40 is provided for filtering the light beam 211 entering into the optical detector 30 to ensure that the optical detector 30 receives light with single polarization. The optical lens 50 is provided for converging the light beam 211 approaching the optical detector 30.

Figure 2:
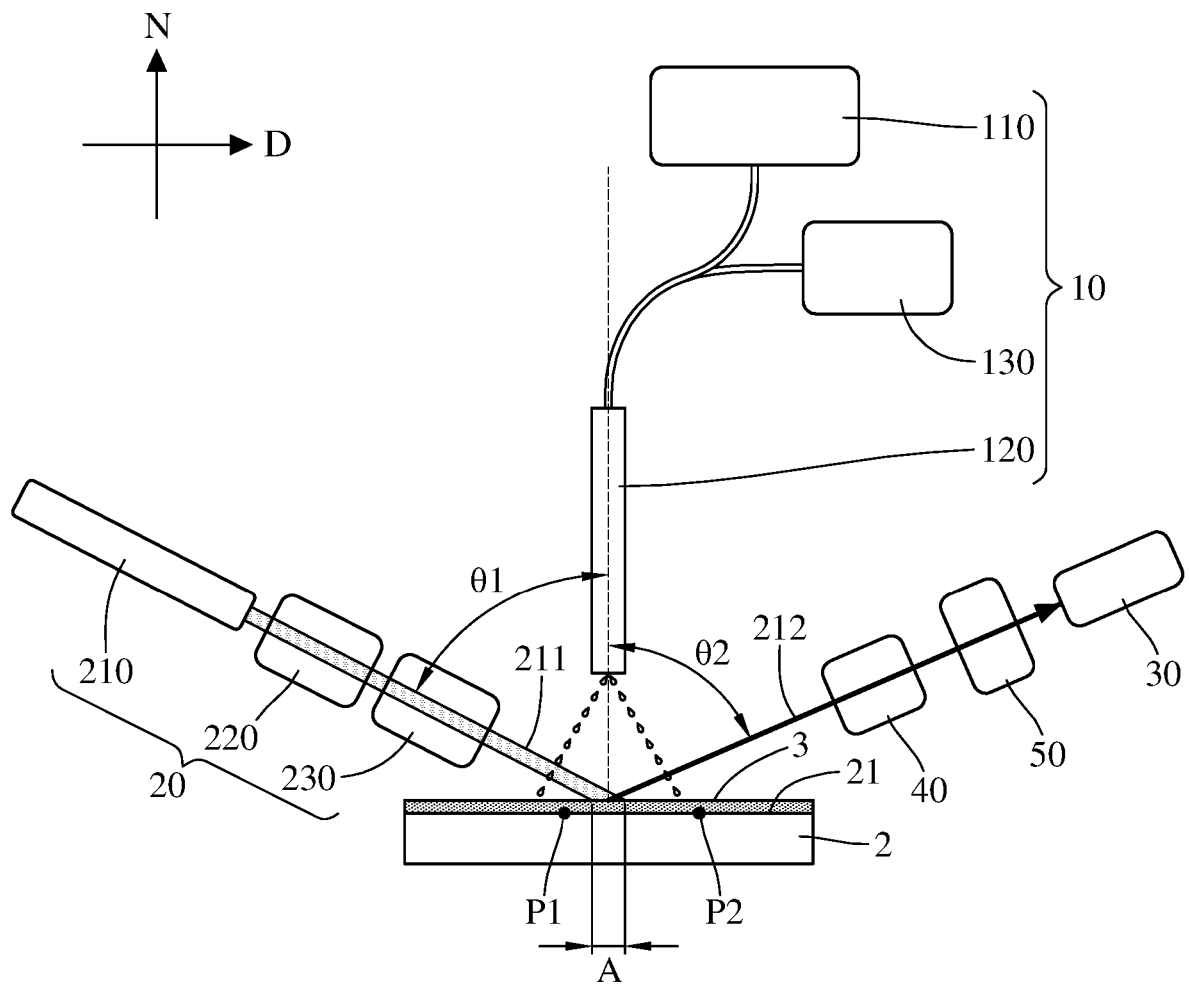
FIG. 2 is a schematic view of detecting an object by the surface wettability determination system in FIG. 1.
Figure 3:
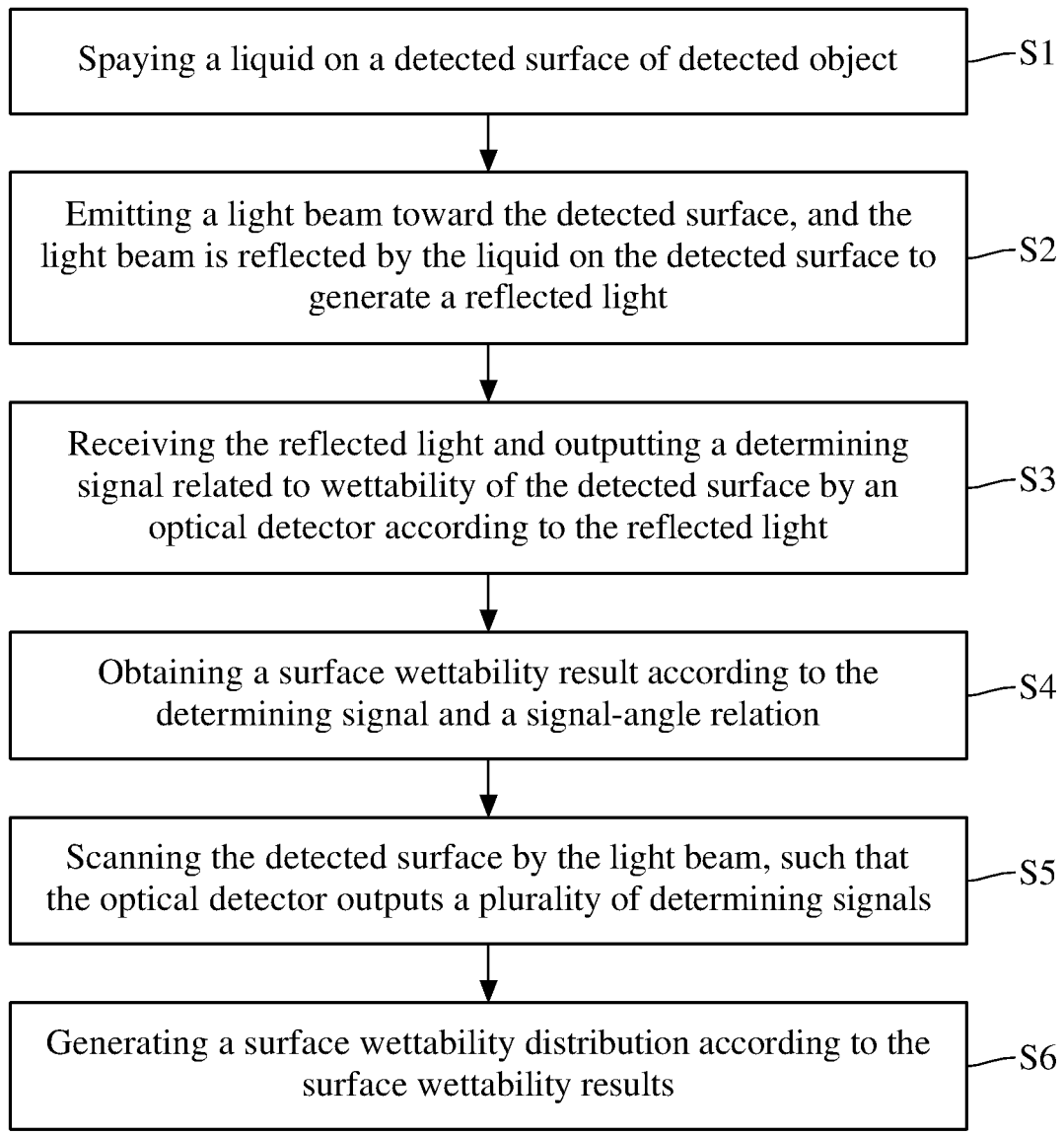
FIG. 3 is a flow chart showing a surface wettability determination method according to one embodiment of the present disclosure.

The following is an illustration of a surface wettability determination method according to one embodiment of the present disclosure. Please refer to FIG. 2 and FIG. 3. FIG. 2 is a schematic view of detecting an object by the surface wettability determination system in FIG. 1, and FIG. 3 is a flow chart showing a surface wettability determination method according to one embodiment of the present disclosure. In one embodiment, a surface wettability determination method includes steps S1~S6. The surface wettability determination method in FIG. 3 is implemented by the surface wettability determination system 1 in FIG. 1, while the present disclosure is not limited by the system or apparatus used to implement surface wettability determination method.

In the step S1, the liquid is sprayed on a detected surface 21 of a detected object 2. The detected object 2, for example but not limited to, is a shoe material, a ceramic material, a semiconductor, a polymer, a foaming material or a cloth. The detected surface 21 is an exposed outer surface of the detected object 2, and the outer surface has a certain degree of hydrophilicity or hydrophobicity. The liquid is delivered from the container 110 to the spray nozzle 120 via the pump 130 of the sprayer 10, and is evenly distributed on the detected surface 21 by the spray nozzle 120. The liquid covers the detected surface 21 in a manner depending on the wettability of the detected surface 21. When the detected surface 21 is more hydrophilic, the liquid spreads over the detected surface 21 to form a liquid film. When the detected surface 21 is less hydrophilic (more hydrophobic), the liquid clusters to form multiple droplets with similar or various sizes on the detected surface 21. For example, FIG. 2 shows the liquid spreads to form a liquid film 3 on the highly hydrophilic detected surface 21.

In the step S2, the light beam 211 is emitted to approach the detected surface 21 of the detected object 2, and the light beam 211 is reflected by the liquid on the detected surface 21 to generate a reflected light 212. As shown in FIG. 2, the light emitting component 210 of the surface wettability determination system 1 emits the light beam 211 toward the detected surface 21. In this embodiment, the light emitting component 210 is a laser emitter configured to emit laser beam.

The beam shaper 220 is configured to properly collimate the light beam 211 and adjust the diameter of the light beam 211. When the light beam 211 reaches the liquid on the detected surface 21, the light beam 211 is reflected by the liquid or scattered by the detected surface 21 according to the wettability of the detected surface 21. More specifically, as shown in FIG. 2, the liquid sprayed on the detected surface 21 forms a liquid film 3 when the detected surface 21 is more hydrophilic, and most amount of light in the light beam 211 is reflected by the liquid film 3. The liquid sprayed on the detected surface 21 forms multiple droplets when the detected surface 21 is more hydrophobic, and most amount of light in the light beam 211 is scattered by the detected surface 21.

In the step S3, the reflected light 212 is received by the optical detector 30, the optical detector 30 outputs a determining signal according to the reflected light 212, and the determining signal is related to the wettability of the detected surface 21. As shown in FIG. 2, the optical detector 30 and the light emission device 20 are disposed opposite to each other with respect to a normal line of the detected surface 21. The optical detector 30 can receive the reflected light 212, and then generate signal according to the intensity of reflected light 212. Specifically, as to hydrophilic detected surface 21, the light beam 211 is mostly reflected by the liquid film 3 to generate the reflected light 212 with high intensity, such that the optical detector 30 outputs signal with higher intensity; as to hydrophobic detected surface 21, the light beam 211 is mostly scattered by the detected surface 21 to generate the reflected light 212 with low intensity, such that the optical detector 30 outputs signal with lower intensity.

Any detector capable of receiving light and converting optical signal (light intensity) into electric signal (determining signal) for outputting can be considered as the optical detector 30 in this embodiment, and the output determining signal can be in a form of electric current, voltage, thermal energy or like physical quantity. For example, either a photo-thermal detector or a photoelectric detector can be considered as the optical detector 30.

In this embodiment, the polarizer 230 is configured to modulate the light beam 211 to change the light beam 211 into polarized light. The analyzer 40 and the optical lens 50 are configured to focus the reflected light 212, which is also a polarized light, on the optical detector 30. When the liquid film is on the detected surface 21, the optical detector 30 receives the reflected light 212 with higher intensity; when the liquid droplets are on the detected surface 21, the optical detector 30 receives the reflected light 212 with lower intensity. Therefore, it is favorable for detecting the liquid on the detected surface 21 is either liquid film or liquid droplets, as well as providing high detectability in wettability determination.

In this embodiment, the optical detector 30 and the light emission device 20 are disposed opposite to each other with respect to a normal line of the detected surface 21, and the angle between the optical detector 30 and a normal line N of the detected surface 21 is the same as the angle between the light emission device 20 and the normal line N of the detected surface 21. In detail, the light beam 211 generated by the light emitting component 210 of the light emission device 20 has an angle θ1 relative to the normal line N of the detected surface 21, the reflected light 212 generated by reflection of the light beam 211 on the liquid film 3 has an angle θ2 relative to the normal line N, and the angle θ1 equal to the angle θ2. Therefore, it is favorable for the optical detector 30 only receiving the reflected light 212 so as to prevent the influence of scattered light on the surface wettability determination.

In the step S4, a surface wettability result is obtained according to the determining signal and a signal-angle relation. In detail, the determining signal is compared with a database to obtain a surface wettability result corresponding to a specific position on the detected surface 21. Said surface wettability result can be output by an electronic device (not shown in the drawings). Furthermore, the surface wettability result can be a message or an image representing "hydrophilic" or "hydrophobic", or a quantitative value indicating the degree of wettability.

Figure 4:
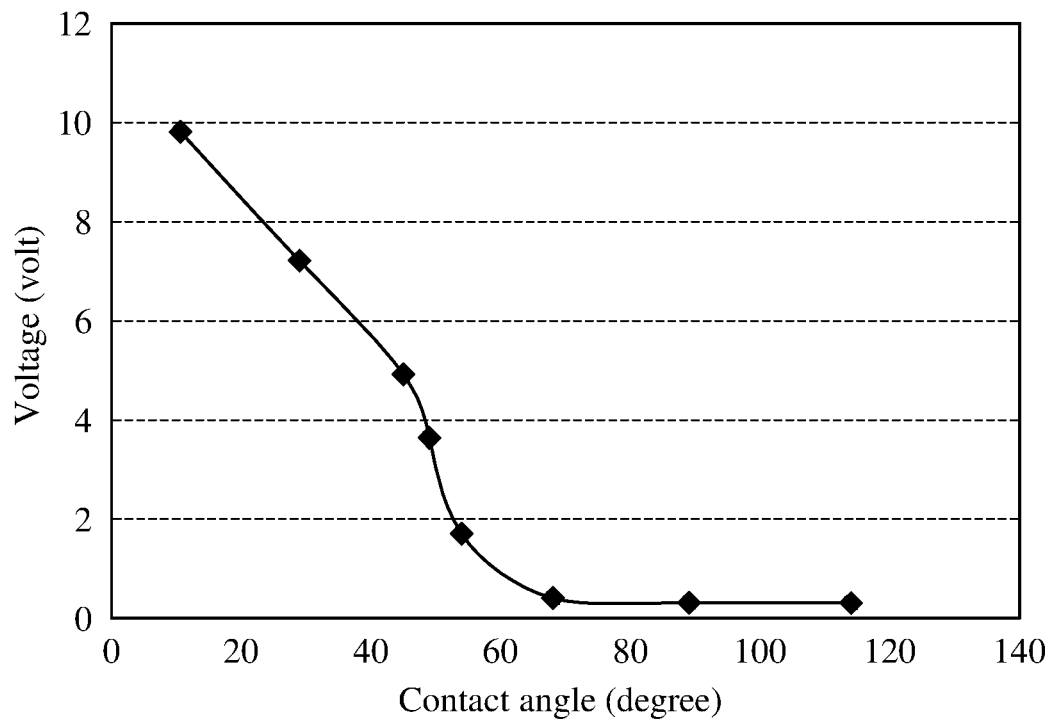
FIG. 4 is a diagram showing a relationship between reference signal and contact angle.

The database can be created in advance, and the database, for example, is stored in a storage medium of computer. The database includes a plurality of reference signals and a plurality of contact angles, and the contact angles are angles of a liquid on the detected surface. The database further includes the signal-angle relation which is a relationship between the reference signals and respectively corresponding contact angles. FIG. 4 is a diagram showing a relationship between reference signal and contact angle, and the reference signal in this figure is in a form of voltage.

The following is an exemplary method of establishing the signal-angle relation. A sample, which is made of the same material as the detected object 2, is cut into pieces, and the surface of each piece is modified by ultraviolet light or plasma to have different wettability. The liquid is sprayed on the pieces, and the contact angle of the liquid on each piece is measured. Then, the pieces are detected by the surface wettability determination method disclosed in the present disclosure so as to obtain signals corresponding to the surface wettability of respective pieces, and these signals are considered as reference signals. The reference signals and the contact angles are analyzed by regression to establish a curve representing the signal-angle relation. The curve specifically shows a relationship between the wettability of the detected surface 21 and the determining signal obtained in the step S3. It is noted that the present disclosure is not limited by the curve representing the signal-angle relation. In some other embodiments, a data sheet or a chart can be used to represent the signal-angle relation.

According to one embodiment of the present disclosure, the surface wettability determination system 1 further includes a computing unit. The computing unit, for example, is a calculator or a processing chip in the surface wettability determination system 1. The computing unit is communicated with the optical detector 30 for receiving the determining signal from the optical detector. The aforementioned database can be stored in the computing unit, or the computing unit captures the database from external storage medium. The computing unit determines the wettability of the detected surface 21 by comparing the determining signal with the database; that is, the step S4 is implemented by the computing unit.

After the step S4 is finished, a surface wettability result corresponding to a single position on the detected surface 21 is obtained. In this embodiment, the surface wettability determination method further includes a step of determining the wettability of some other positions or even all positions on the detected surface 21. The following is an illustration of surface wettability determination for all positions on the detected surface 21.

In the step S5, the detected surface 21 is scanned by the light beam 211, such that the optical detector 30 outputs a plurality of determining signals corresponding to different positions on the detected surface 21. As shown in FIG. 2, the light emission device 20 is moved relative to the detected object 2 along a direction D orthogonal to the normal line N of the detected surface 21 to detect all positions on the detected surface 21. The optical detector 30 receives reflected light generated by the liquid at different positions on the detected surface 21, thereby outputting multiple determining signals. The determining signals correspond to the surface wettability at respective positions. Referring to FIG. 2, when the light beam 211 scans the detected surface 21 to pass through a first position P1, part of the liquid film 3 at the first position P1 reflects the light beam 211 to generate the reflected light 212, and the optical detector 30 receives the reflected light 212 to output a determining signal corresponding to the surface wettability at first position P1. When the light beam 211 scans the detected surface 21 to pass through a second position P2, another part of the liquid film 3 at the second position P2 reflects the light beam 211 to generate the reflected light 212, and the optical detector 30 receives the reflected light 212 to output another determining signal corresponding to the surface wettability at second position P2.

Moreover, when the light beam 211 approaches the detected surface 21, the sprayer 10 continuously sprays liquid on the detected surface 21. In the step S5, the sprayer 10 continuously sprays liquid to keep the liquid film 3 complete or the droplets sufficient on the detected surface 21, thereby ensuring the reliability of surface wettability determination. It is noted that the present disclosure is not limited by continuous liquid spray. In some other embodiment, the sprayer 10 stops spraying liquid in the step S5.

Figure 5:
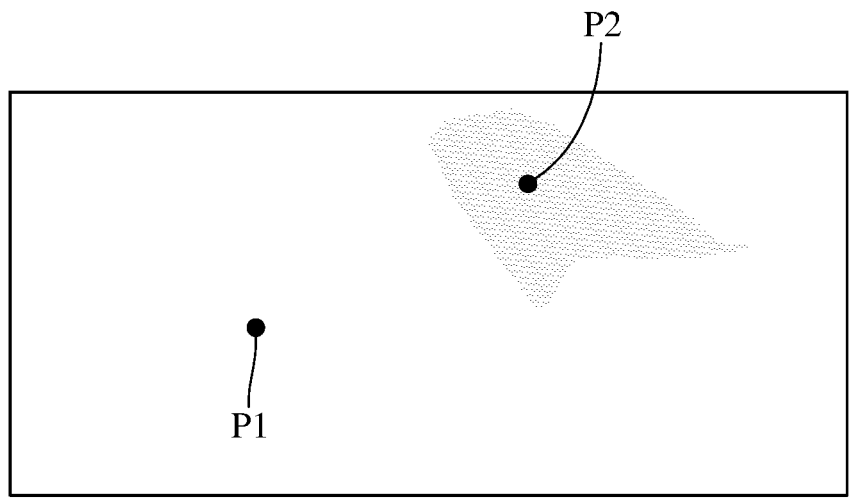
FIG. 5 is a schematic view of surface wettability distribution.

In the step S6, a surface wettability distribution is generated according to the surface wettability results corresponding to different positions on the detected surface 21. FIG. 5 is a schematic view of surface wettability distribution.

The output determining signals in the step S5 are compared with the signal-angle relation in the database to obtain the surface wettability results corresponding to respective positions on the detected surface 21, The surface wettability results are represented by a distributing topographic graph. In detail, after the step S5 is finished, the optical detector 30 transmits the determining signals to a computer (not shown in the drawings). The computer includes image processing software for receiving the determining signals and converting the determining signals into an image on a display (not shown in the drawings). According to the signal strength of each determining signal corresponding to respective position on the detected surface 21, color distribution or gray scale distribution is shown in the distributing topographic graph (surface wettability distribution). Referring to FIG. 2, since a region of the detected surface 21 where the first position P1 is located is more hydrophilic, the optical detector 30 outputs determining signals with higher intensity, and this region is white in the distributing topographic graph. Similarly, since another region of the detected surface 21 where the second position P2 is located is more hydrophobic, the optical detector 30 outputs determining signals with lower intensity, and this region is gray in the distributing topographic graph. Thus, a user quickly finds out regions of the detected surface 21 with abnormal surface wettability according to the surface wettability distribution, thereby determining whether the detected object 2 is defective.

It is noted that the present disclosure is not limited by the representation of surface wettability results. In some other embodiments, the surface wettability results are represented by a chart or a data sheet.

Furthermore, as shown in FIG. 2, according to one embodiment of the present disclosure, the light beam 211 approaches the detected surface 21 at an angle $\theta 1$ of incidence of 30.0 degrees to 85.0 degrees. A proper range of the angle $\theta 1$ is favorable for enhancing the detectability of the surface wettability determination system 1. Please refer to the following TABLE 1, which shows the angle $\theta 1$ of incidence and corresponding detectability. In one embodiment, both the determining signal and the reference signal are in a form of voltage, and the definition of detectability is a ratio of the voltage, corresponding to hydrophilic region (liquid film), to the voltage corresponding to hydrophobic region (liquid droplets). That is, the following condition is satisfied: (detectability)=(output voltage according to reflected light at hydrophilic region)/(output voltage according to reflected light at hydrophobic region).

TABLE 1

| | Angle of incidence (degree) | | | | | | |
|---|---|---|---|---|---|---|---|
| | 30.0 | 40.0 | 50.0 | 60.0 | 70.0 | 80.0 | 85.0 |
| Detectability | 4.3 | 5.5 | 5.4 | 8.4 | 17.5 | 38.3 | 30.1 |

In TABLE 1, when the angle $\theta 1$ is between 30.0 degrees and 85.0 degrees, the voltage corresponding to hydrophilic region is apparently greater than the voltage corresponding to hydrophobic region; more specifically, the voltage corresponding to hydrophilic region is four times greater than the voltage corresponding to hydrophobic region. Thus, the surface wettability determination system of the present disclosure is capable of accurately distinguishing higher hydrophilic region and lower hydrophilic region on the detected surface 21 in order to determine the surface wettability at different regions of the detected surface 21; that is, the surface wettability determination system is capable of accurately identifying the difference between liquid film and liquid droplets.

When the angle θ1 is less than 30.0 degrees, the detectability of the surface wettability determination system 1 is decreased, which may cause that the boundary between hydrophilic region and hydrophobic region cannot be clearly identified. When the angle θ1 is greater than or equal to 90.0 degrees, the optical detector 30 cannot receive sufficient amount of reflected light 212. Thus, it is favorable for identifying the difference between liquid film and liquid droplets as the angle θ1 is less than 90.0 degrees, and is 30.0 degrees to 85.0 degrees in some other embodiments.

According to the present disclosure, the liquid is sprayed on the detected surface of the detected object, and the light beam is reflected by the liquid on the detected surface to generate the reflected light. The optical detector receives the reflected light and outputs the determining signal, and the surface wettability is determined according to the determining signal. For example, a determining signal with higher intensity indicates hydrophilic surface, and another determining signal with lower intensity indicates hydrophobic (low hydrophilic) surface. In comparison with conventional surface wettability determination techniques, the surface wettability determination system of the present disclosure achieves wettability determination on large surface, such that the present disclosure is more applicable to production line. Moreover, the reflected light received by the surface wettability determination system is generated by the reflection of light, and such reflection results from the liquid on the detected surface, such that the surface wettability determination is not influenced by the shape of detected object, the roughness thereof, the color thereof, or the material thereof.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A surface wettability determination method, comprising:
    spraying a liquid on a detected surface of a detected object;
    emitting a light beam toward the detected surface, wherein the light beam approaches the detected surface at an angle of incidence from 30.0 degrees to 85.0 degrees, the light beam is reflected by the liquid on the detected surface to generate a reflected light; and
    receiving the reflected light and outputting a determining signal by an optical detector according to a light intensity of the reflected light generated by reflection of the light beam from the liquid, wherein the light intensity of the reflected light received by the optical detector is dependent on shape of the liquid on the detected surface with shape of the liquid influenced by a wettability of the detected surface, and the determining signal is related to the wettability of the detected surface;
    wherein a first output voltage of the determining signal is obtained when the optical detector receives the reflected light generated by reflection of the light beam from the liquid at a hydrophilic region on the detected surface, a second output voltage of the determining signal is obtained when the optical detector receives the reflected light generated by reflection of the light beam from the liquid at a hydrophobic region on the detected surface, and the first output voltage is four times greater than the second output voltage.

2. The surface wettability determination method of claim 1, further comprising:
    obtaining a surface wettability result according to the determining signal and a signal-angle relation, wherein the signal-angle relation is a relationship between a plurality of reference signals and a plurality of contact angles of the liquid on the detected surface in a database, and the plurality of contact angles respectively correspond to the reference signals.

3. The surface wettability determination method of claim 2, further comprising:
    scanning the detected surface by the light beam, such that the optical detector outputs a plurality of determining signals corresponding to different positions on the detected surface; and
    generating a surface wettability distribution according to the surface wettability results corresponding to different positions on the detected surface.

4. The surface wettability determination method of claim 1, wherein the liquid covers the detected surface when the light beam approaches the detected surface.

5. The surface wettability determination method of claim 1, wherein the determining signal is in a form of voltage.

* * * * *